United States Patent [19]

Plumley et al.

[11] Patent Number: 4,560,523
[45] Date of Patent: Dec. 24, 1985

[54] INTRUSION MOLDING PROCESS FOR FORMING COMPOSITE STRUCTURES

[75] Inventors: Ralph M. Plumley, Lancaster; Henry H. Renaud, Jr., Marlboro, both of Mass.

[73] Assignee: A&M Engineered Composites Corporation, Marlboro, Mass.

[21] Appl. No.: 605,202

[22] Filed: Apr. 30, 1984

[51] Int. Cl.$^4$ .................. B29C 17/08; B32B 5/16
[52] U.S. Cl. .................. 264/102; 264/156; 264/250; 264/257; 264/259; 264/273; 264/314; 264/DIG. 6; 425/129 R; 425/389; 425/DIG. 14; 428/68; 428/76; 428/313.9; 428/325
[58] Field of Search .......... 264/DIG. 6, 101, 102, 264/250, 257, 259, 273, 274, 279, 156, 314; 428/313.3, 313.9, 137, 138, 320.2, 322.7; 425/129 R, 388, 389, DIG. 14

[56] References Cited

U.S. PATENT DOCUMENTS

| | | | |
|---|---|---|---|
| 2,304,631 | 12/1942 | Ensing | 264/273 X |
| 2,806,509 | 9/1957 | Bozzacco et al. | 428/313.9 X |
| 2,903,389 | 9/1959 | Fujita | 264/257 X |
| 2,913,036 | 11/1959 | Smith | 264/102 |
| 3,240,848 | 3/1966 | Burke et al. | 264/102 |
| 3,309,450 | 3/1967 | Rodgers | 264/257 |
| 3,478,134 | 11/1969 | Gruss et al. | 264/45.7 X |
| 3,832,264 | 8/1974 | Barnette | 264/273 X |
| 4,013,810 | 3/1977 | Long | 428/313.9 |
| 4,030,953 | 6/1977 | Rutschow et al. | 264/101 X |
| 4,032,683 | 6/1977 | Coale | 264/DIG. 6 |
| 4,132,755 | 1/1979 | Johnson | 264/102 X |
| 4,250,136 | 2/1981 | Rex | 264/257 |
| 4,405,543 | 9/1983 | Murphy et al. | 264/DIG. 6 |

FOREIGN PATENT DOCUMENTS

| | | | |
|---|---|---|---|
| 1954070 | 4/1971 | Fed. Rep. of Germany | 264/102 |
| 56-135025 | 10/1981 | Japan | 264/101 |
| 58-55217 | 4/1983 | Japan | 264/273 |
| 1123166 | 8/1968 | United Kingdom | 264/102 |
| 1270302 | 4/1972 | United Kingdom | 264/274 |
| 929444 | 5/1982 | U.S.S.R. | 264/101 |

Primary Examiner—Philip Anderson
Attorney, Agent, or Firm—John E. Toupal; Harold G. Jarcho

[57] ABSTRACT

The invention is a method of forming a composite structure which begins with the formation of a syntactic foam core having internal communication passages that terminate with a plurality of openings in the outer surface of said core. After being wrapped with a plurality of layers of porous material, the wrapped core is positioned in a cavity of a mold having an inlet communicating with one of the openings. A source of uncured resin mix then is connected to the inlet and the mold is evacuated. After being forced through the inlet and the passages to fill the mold and impregnate said fibrous material, the resin mix is cured to provide with the core and the fibrous material a rigid composite structure.

17 Claims, 1 Drawing Figure

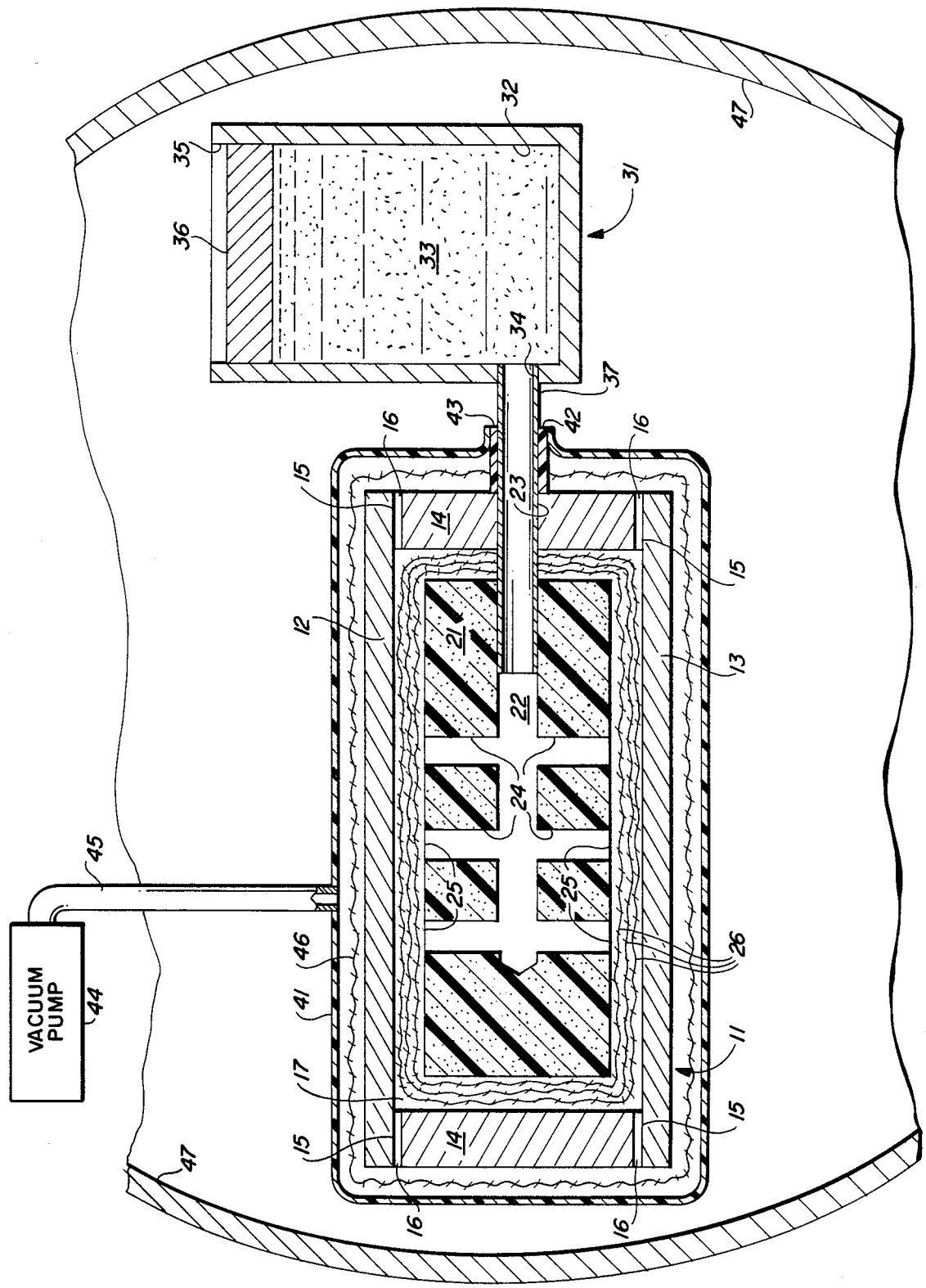

INTRUSION MOLDING PROCESS FOR FORMING COMPOSITE STRUCTURES

BACKGROUND OF THE INVENTION

This invention relates generally to a method of forming composite structures and, more particularly, to such a method that employs an intrusion molding process.

Composites are utilized in many applications requiring defined structures exhibiting both relatively high strength and low weight. Such composites generally consist of laminates joined together to provide an integral structure having the combined physical and chemical characteristics of the materials utilized. Frequently used materials include thermal setting resins and high strength fiberglass cloth. A well known composite to which the present invention is directed consists of resin impregnated fiberglass cloth laminated over a syntactic foam core composed of small hollow spheres embedded in a resin matrix.

One prior method of producing syntactic foam cored fiberglass laminates includes the steps of casting the syntactic core, laminating and curing resin impregnated fiberglass into opposing skin halves to form a shell, preparing and bonding the core between the skin halves, laminating resin impregnated fiberglass reinforcement around the seams between the core and the laminate and sanding and preparing the outside surface of the laminate to the required dimensions. This method is highly labor intensive because of the requirements for preshaping the core to fit between the laminate skins, matching the skin halves to facilitate a close fit at the seams and overlaying and finishing the seams. Other disadvantages are that the method fails to produce complete contact between the core and the skin laminate thereby creating areas of weakness and the completed composite exhibits a seam rather than a continuous outer skin.

Another prior method of producing syntactic foam cored fiberglass laminates includes the steps of casting the core, preparing the core for laminate, laminating resin impregnated fiberglass cloth around the core, vacuum bagging and curing the wrapped laminate and machining the outside surface of the laminate to the required finish. This method also is labor intensive because of the significant requirements for laminate machining to establish the required finish. In addition, sharp outside corners cannot be molded and the final outside shape of the composite is somewhat irregular.

The object of this invention, therefore, is to provide an improved method of producing composites consisting of a fiberglass reinforced plastic laminate enclosing a syntactic foam core.

SUMMARY OF THE INVENTION

The invention is a method of forming a composite structure which begins with the formation of a syntactic foam core having internal communication passages that terminate with a plurality of openings in the outer surface of the core. After being wrapped with a plurality of layers of porous preimpregnated laminating material, the wrapped core is positioned in a cavity of a mold having an inlet communicating with one of the openings. A source of uncured syntactic foam resin mix then is connected to the inlet and the mold is evacuated. After being forced through he inlet and the passages to fill the mold between the core and the laminating material, the resin mix and laminating material are cured to provide with the core a rigid composite structure.

According to specific features of the invention, the mold defines communication paths into the cavity, the evacuating step comprises enclosing the mold in a hermetically sealed bag and connecting the interior of the bag to a vacuum pump, and the curing step comprises positioning the mold in an autoclave and applying therein heat and pressure. The use of an evacuated bag and an autoclave facilitates formation of the desired composite.

According to another feature of the invention, the source of resin mix comprises a closed reservoir defining an outlet and a resin mix filled chamber and having a piston wall portion movable to reduce the volume of the chamber. After connection of the outlet to the mold inlet and positioning of the reservoir in the autoclave, the pressure therein moves the piston wall portion to force the resin mix into the mold.

According to yet another feature of the invention, a porous spacer material is positioned between the mold and the bag. The porous spacer material provides a flow path for evacuation.

According to still another feature of the invention, the syntactic foam core is cast and the passages machined therein. Casting and machining are preferred steps of producing the required core.

DESCRIPTION OF THE DRAWING

These and other objects and features of the invention will become more apparent upon a perusal of the following description taken in conjunction with the accompanying drawing which is a schematic cross-sectional view illustrating the formation of a composite according to the present invention.

DESCRIPTION OF THE PREFERRED COMPOSITE

Schematically illustrated in the drawing is a female mold 11 including a top wall 12 and a bottom wall 13. Joining the top and bottom walls 12, 13 are side walls 14. Slots 16 in the side walls 14 at their intersections 15 with the top and bottom walls 12, 13 provide communication paths between the exterior of the mold 11 and a cavity 17 defined thereby.

A syntactic foam core 21 is centrally positioned within the cavity 17. Defined by the core 21 is a central passage 22 that terminates with an inlet opening 23 in an outer side surface of the core 21. Also defined by the core 11 are a plurality of transverse passages 24 that communicate with the central passage 22. The transverse passages 24 terminate with discharge openings 25 in the upper and lower surfaces of the core 21. Wrapped around the core 21 are multiple layers 26 of fiberglass cloth.

A reservoir 31 defines a chamber 32 filled with an intrusion resin mix 33. Also defined in a side wall of the reservoir 31 is an outlet opening 34. An open upper end 35 of the reservoir 31 is closed by a piston 36 movable to vary the volume of the chamber 32. Providing communication between the outlet opening 34 in the reservoir 31 and the inlet opening 23 in the foam core 21 is a fill tube 37.

Hermetically sealed around the mold 11 is an air impervious bag 41. An opening 42 in the bag 41 accommodates the fill tube 37 and is hermetically sealed thereto by a sealant 43. Extending between the interior of the bag 41 and a vacuum pump 44 is an evacuation tube 45. A porous fiberglass cloth spacer 46 is disposed between the mold 11 and the bag 41. Enclosing both the reservoir 31 and the bagged mold 11 is an autoclave 47.

While various compatible combinations are possible, the following is an example of suitable materials for producing a composite structure according to the present invention.

1. Syntactic foam core 21 with a density of 30–40 pounds per cubic foot:
   a. Shell 828 resin 48 parts by weight
   b. Shell 871 resin 32 parts by weight
   c. a coupling agent 0.16 parts by weight
   d. a mixture of glass hollow spheres in the 50–100 micron diameter range 20 parts by weight
   e. "A" hardener 4 parts by weight.
2. Intrusion resin mix 33:
   a. Shell 828 resin 53 parts by weight
   b. Shell 871 resin 35 parts by weight
   c. a coupling agent 0.16 parts by weight
   d. a mixture of glass hollow spheres in the 50–100 micron diameter range 20 parts by weight
   e. "A" hardener 4.4 parts by weight.
3. Laminate wrappng 26: epoxy preimpregnated fiberglass (Ferro-Cordo-E293/7781).

DESCRIPTION OF PREFERRED METHOD

In accordance with the invention, the mold 11 is formed with a cavity 17 having the size and shape of the desired coposite and the syntactic foam core 21 is cast with somewhat smaller outer dimensions. Although the core 11 can be cast with the central passage 22 and the transverse passages 24, it is preferred that the passages be machined after initial casting thereof. The core 21 then is wrapped with laminations of preimpregnated fiberglass cloth 26, the number of plys determined by desired wall thickness. After insertion of the laminated core 21, the mold 11 is closed and one end of the tube 37 is inserted through the opening 38 in the side wall 14 and into the inlet opening 23 in the core 21. The opposite end of the tube 37 is inserted into the outlet opening 34 of the reservoir 31 which then is filled with resin and closed by the piston 36. After being covered by the porous fiberglass cloth 46, the mold 11 is enclosed by the air impervious bag 41 which then is hermetically sealed. After filling of the reservoir 31 with the intrusion resin mix 33 and connection of the evacuatin tube 45 to the vacuum pump 44, the bagged mold 11 and reservoir 31 are positioned within the autoclave 47.

Activation of the vacuum pump 44 results in evacuation of the mold cavity 17 and the core passages 22, 24 via the communication slots 16, the bag 41 and the evacuation tube 45. A continuous evacuation path between the outer surface of the mold 11 and the inner surface of the bag 41 is ensured by the porous fiberglass spacer 46. A pressure of 70 p.s.i. within the autoclave 47 pushes the piston 36 downwardly into the reservoir 31 and forces the intrusion resin mix 33 through the tube 37 and into the mold 11 where it impregnates the fiberglass laminate 26 while completely filling both the mold cavity 17 and the core passages 22, 24. After being forced into the mold 11, the intrusion resin mix 33 is cured by the application within the autoclave 47 of heat (300°–350° F.) for a period of 2–3 hours. The mold 11 then is removed from the autoclave 47 and opened to release a fully cured seamless composite of desired size and shape.

Obviously, many modifications and variations of the present invention are possible in light of the above teachings. It is to be understood, therefore, that the invention can be practiced otherwise than as specifically described.

What is claimed is:

1. The method of forming a composite structure including the steps:
   forming a syntactic foam core having internal communicating passages that terminate with an inlet opening and a plurality of discharge openings in the outer surface of said core;
   wrapping said syntactic foam core with a plurality of layers of porous preimpregnated laminating material;
   positioning said wrapped core in a cavity of mold having an inlet communicating with one of said openings;
   connecting a source of uncured syntactic foam resin mix to said inlet;
   evacuating said mold;
   forcing said uncured resin mix through said inlet opening, said passages and said discharge openings to fill said mold between said core and said laminating material; and
   curing said resin mix and said preimpregnated laminating material to provide with said core a rigid composite structure.

2. A method according to claim 1 wherein said curing step comprises the application of heat.

3. A method according to claim 1 wherein said mold defines communication paths into said cavity and said evacuating step comprises enclosing said mold in a hermetically sealed bag and connecting the interior of said bag to a vacuum pump means.

4. A method according to claim 3 wherein said curing step comprises positioning said mold in an autoclave and applying therein heat and pressure.

5. A method according to claim 4 wherein said source of resin mix comprises a closed reservoir defining an outlet and a resin mix filled chamber and having a piston wall portion movable to reduce the volume of said chamber; and said forcing step comprises connecting said outlet to said inlet opening and positioning said reservoir in said autoclave whereby said pressure therein moves said piston wall portion to force said resin mix through said outlet, said inlet opening, said passages and said discharge openings into said mold beteen said core and said laminating material.

6. A method according to claim 5 including the step of separating said mold and said bag with a porous spacer material.

7. A method according to claim 6 wherein said forming step comprises casting said syntactic foam core, and machining said passages therein.

8. A method according to claim 7 wherein said porous laminating material comprises epoxy impregnated fiberglass cloth.

9. A method according to claim 8 wherein said porous spacer material comprises fiberglass cloth.

10. A method according to claim 9 wherein said applied heat is between 300° F. and 350° F. and said applied pressure is between 60 psi and 80 psi.

11. A method according to claim 1 wherein said curing step comprises positioning said mold in an autoclave and applying therein heat and pressure.

12. A method according to claim 11 wherein said source of resin mix comprises a closed reservoir defining an outlet and a resin mix filled chamber and having a piston wall portion movable to reduce the volume of said chamber; and said forcing step comprises connecting said outlet to said inlet opening and positioning said reservoir in said autoclave whereby said pressure therein moves said piston wall portion to force said resin mix through said outlet, said inlet opening, said passages and said discharge openings into said mold and between said core and said laminating material.

13. A method according to claim 12 wherein said forming step comprises casting said syntactic foam core, and machining said passages therein.

14. A method according to claim 13 wherein said porous laminating material comprises epoxy impregnated fiberglass cloth.

15. A method according to claim 14 wherein said porous spacer material comprises fiberglass cloth.

16. A method according to claim 15 wherein said applied heat is between 300° F. and 350° F. and said applied pressure is between 60 psi and 80 psi.

17. A method according to claim 1 wherein said forming step comprises casting said syntactic foam core, and machining said passages therein.

* * * * *